US012762957B2

(12) United States Patent
Rosales et al.

(10) Patent No.: US 12,762,957 B2
(45) Date of Patent: Oct. 13, 2026

(54) BLIND SPOT BASED RISK ASSESSMENT OF ROAD MANEUVERS

(71) Applicant: Intel Corporation, Santa Clara, CA (US)

(72) Inventors: Rafael Rosales, Unterhaching (DE); Ignacio J. Alvarez, Portland, OR (US); Michael Paulitsch, Ottobrunn (DE)

(73) Assignee: Intel Corporation, Santa Clara, CA (US)

(*) Notice: Subject to any disclaimer, the term of this patent is extended or adjusted under 35 U.S.C. 154(b) by 350 days.

(21) Appl. No.: 18/475,274

(22) Filed: Sep. 27, 2023

(65) Prior Publication Data

US 2025/0104562 A1 Mar. 27, 2025

(51) Int. Cl.

| | |
|---|---|
| ***G08G 1/16*** | (2006.01) |
| ***B60W 50/16*** | (2020.01) |
| ***G01S 13/931*** | (2020.01) |
| ***G06V 20/58*** | (2022.01) |

(52) U.S. Cl.

CPC ............. *G08G 1/167* (2013.01); *B60W 50/16* (2013.01); *G01S 13/931* (2013.01); *G06V 20/58* (2022.01); *G01S 2013/9315* (2020.01)

(58) Field of Classification Search

CPC ....... G08G 1/167; G08G 1/166; B60W 50/16; B60W 2050/143; B60W 2554/402; B60W 2554/4041; B60W 50/14; G01S 13/931; G01S 2013/9315; G01S 2013/9316; G01S 7/003; G01S 2013/9323; G01S 2013/9324; G01S 2013/93274; G01S 15/931; G01S 17/931; G06V 20/58

See application file for complete search history.

(56) References Cited

U.S. PATENT DOCUMENTS

| | | | | |
|---|---|---|---|---|
| 7,852,462 | B2 * | 12/2010 | Breed | B60W 30/095 356/28 |
| 8,874,267 | B1 * | 10/2014 | Dolgov | G08G 1/16 701/28 |
| 9,248,834 | B1 * | 2/2016 | Ferguson | B60W 30/09 |
| 9,367,065 | B2 * | 6/2016 | Dolgov | G05D 1/0248 |
| 9,493,117 | B2 * | 11/2016 | Shehan | B60Q 9/008 |
| 10,219,571 | B1 * | 3/2019 | Aloumanis | G08G 1/167 |
| 2021/0139018 | A1 * | 5/2021 | Schwindt | B60W 60/0016 |
| 2021/0370931 | A1 * | 12/2021 | Sannomiya | B60W 30/0956 |
| 2023/0082079 | A1 * | 3/2023 | Douillard | G06T 7/20 382/155 |

OTHER PUBLICATIONS

Youtube, Truck smart, "Truck Smart Module 3—Blind Spots", retrieved from https://www.youtube.com/watch?v=P0hzWmuAIPk on Apr. 17, 2025, 8 pages.

(Continued)

*Primary Examiner* — Peter D Nolan
*Assistant Examiner* — Demetra R Smith-Stewart
(74) *Attorney, Agent, or Firm* — Viering, Jentschura & Partner mbB

(57) ABSTRACT

A device for blind spot determination of a second vehicle in a vicinity of a first vehicle includes a processor, configured to determine one or more context variables associated with the second vehicle; modify a model of the second vehicle based on one or more context variables; and determine a probability of the first vehicle being within an area of limited visibility in the modified model.

18 Claims, 9 Drawing Sheets

(56) References Cited

OTHER PUBLICATIONS

Virgilio G., V. R. et al., “Vision-Based Blind Spot Warning System by Deep Neural Networks”, MCPR, 2020, pp. 185-194, LNCS 12088, Springer Nature Switzerland AG, Mexico.
Kedarkar, P. et al., “Prevention Device for Blind Spot Accident Detection and Protection”, International Research Journal of Engineering and Technology (IRJET), Jan. 2019, pp. 624-627, vol. 6, Issue 1, IRJET.
ETSI, “Intelligent Transport Systems (ITS); Multi-Channel Operation Study; Release 2”, ETSI TR 103 439, 2021, 143 pages, V 2.1.1.
Frampton, R. J. et al., “Vulnerable Road User Protection from Heavy Goods Vehicles Using Direct and Indirect Vision Aids”, Sustainability, Mar. 11, 2022, 16 pages, vol. 14, Issue 6, MDPI.

* cited by examiner

BLIND SPOT BASED RISK ASSESSMENT OF ROAD MANEUVERS

TECHNICAL FIELD

Various aspects of this disclosure generally relate to the use of sensor data to determine blind spots of nearby vehicles, the determination of risk associated with these blind spots, the display of the blind spots and/or risk to a driver, and the optional generation of driving instructions to reduce the resulting risk.

BACKGROUND

Conventional blind spot detection devices typically focus on the detection of blind spots surrounding one's own vehicle rather than the danger that one is placed in by virtue of other drivers' blind spots. That is, in such approaches, a driver mitigates the driver' risk by mitigating the risk that the driver presents to other drivers. In contrast, however, these conventional devices do not provide information to a first driver about whether the first driver may be in a second driver's blind spot.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
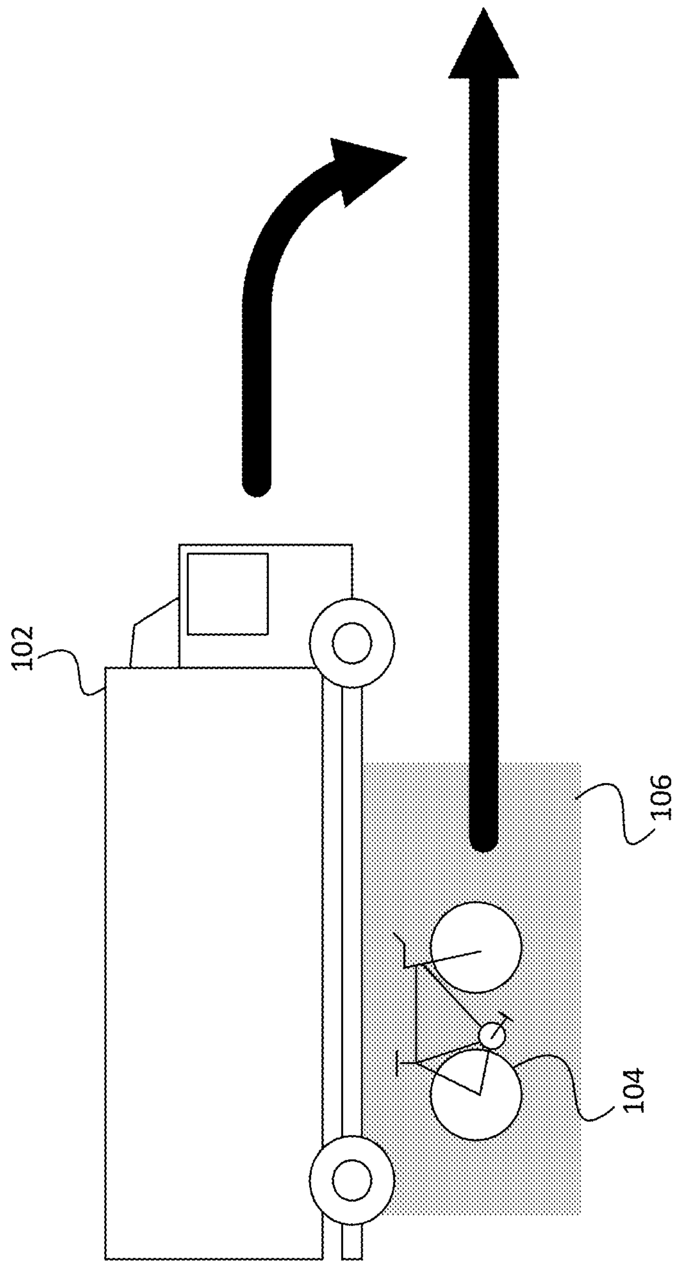
FIG. 1 depicts a conventional blind spot warning system.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radiofrequency (RF) transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Throughout this disclosure, the terms "first vehicle" and "second vehicle" may be used. The first vehicle is generally a vehicle in which, or from whose perspective, the blind spot calculations are made. In some contexts, this may be known as an "ego vehicle". The second vehicle is generally a vehicle, whose blind spots are calculated, estimated, determined, etc. by the first vehicle. Generally, the driver of the first vehicle is informed about blind spots of the second vehicle and the risks to the first vehicle that these blind spots pose.

Throughout this disclosure, the term "blind spot" is used. A blind spot may generally refer to any point or area (whether in 2 dimensions or 3 dimensions) in which the visibility of a driver of the vehicle is limited. Blind spots may occur because an opaque structure obstructs the driver's view of the blind spot (e.g. a vehicle support frame blocks the driver's view, so that the driver cannot visualize a nearby vehicle). Blind spots may also occur because visualization devices such as mirrors have a limited frame of view and are unable to provide a full 360° view of the vehicle's surroundings.

Conventional blind spot warning systems reduce blind-spot risk by informing a driver of a first vehicle if a vehicle/pedestrian/cyclist is present in the first vehicle's own blind spot. For example, in FIG. 1, a tractor-trailer 102 is driving on a roadway alongside a cyclist 104, who is a vulnerable road user. The use cyclist 104 is traveling in a blind spot 106 of the tractor-trailer 102. That is, the driver of the tractor-trailer 102 cannot see the cyclist 104, whenever the cyclist is traveling in the area marked as 106. Conventional systems may provide the driver of the tractor-trailer 102 with information about whether a vehicle is in the tractor-trailer's blind spot (the blind spot is represented by the shaded area 106). Conventional blind spot detection systems may include one or more warning systems, such as systems to warn the driver of the tractor-trailer 102 that a vehicle is within its blind spot 106. Conventional blind spot detection systems, however, do not provide drivers (in this case, the cyclist 104) with information that they are within a blind spot of another vehicle (for example, in the blind spot of the tractor-trailer 102). Thus, the cyclist 104 cannot know whether he/she can be seen by the driver of the tractor-trailer 102, or even whether the tractor-trailer 102 includes any mechanisms to alert the driver of the tractor-trailer that a vehicle is in its blind spot.

Conventional systems may utilize a digital twin for blind spot detection; however, these systems only enable the second vehicle to mitigate risk by ensuring that other vehicles are not within its own blind spots. A vulnerable road user (e.g. a driver or passenger of the first vehicle) has no guarantee that the any participants have an operational communication module (e.g. a Vehicle-to-Everything (V2X) communication module), automated driving enabled, nor even a blind spot detection/warning system. Thus, such vulnerable road users generally need to "guess" a worst-case scenario and to avoid being in a potential blind spot within that worst case. However, such blind spot estimations are often substantially underestimated, as blind spots can be much larger than may be conventionally estimated.

In the following, devices and methods for determining the blind spots created by other road users are described, such that a driver may mitigate the driver's own risk by avoiding the blind spots of other drivers. The detection of blind spots as described herein may enable first vehicle drivers to make informed decisions that consider available information about blind spots of other vehicles (e.g. second vehicles), such as by using available user interfaces (such as augmented reality displays). In addition, such detection of blind spots may provide key information to estimate a risk factor of potential vehicle trajectories. Thus, vehicles may be able to assess a likelihood of an accident in a planned trajectory, based on a blind spot of third party vehicles.

The principles and methods disclosed herein extend beyond a conventional digital twin model to include the geometric areas belonging to the blind spots and/or to the visible regions of a vehicle. As will be described in greater detail, these may be obtained by explicit communication from the first vehicle, determined/estimated at an edge-computer, such as through a vehicle database with information about the vehicle geometry and sensors of the specific vehicle model, or using a locally stored database (similar to the database at the edge-server) within the first vehicle.

The device for blind spot detection may estimate and/or confirm an area corresponding to a blind spot and may communicate this detection to road agents for human visualization or for automated planning estimation. In addition, a trajectory risk factor estimation service may be provided to assess the risk of one or more planned trajectories due to the potential inability of a second vehicle to visualize or otherwise appreciate the first vehicle. For example, the principles and methods disclosed herein may permit a first vehicle to be aware of one or more blind spots of a second vehicle. In some circumstances, the first vehicle may be informed of whether the second vehicle is aware of the first vehicle, such as through the second vehicle's use of a blind spot warning system.

Figure 2:
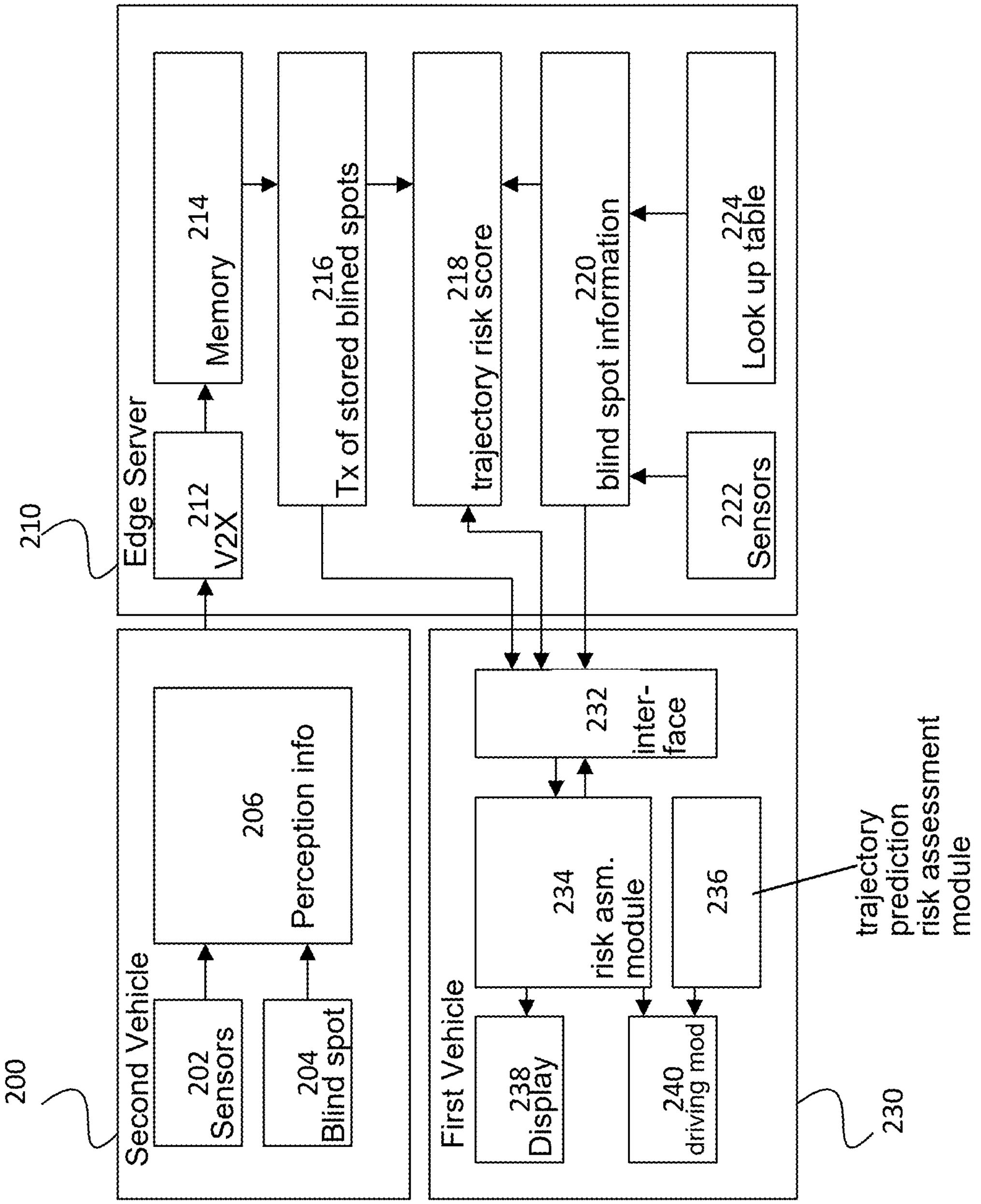
FIG. 2 depicts an overview of blind spot detection based on communication with an edge server.

FIG. 2 depicts an overview of blind spot detection based on communication with an edge server or edge provided service, according to a first configuration. In this figure, a first vehicle 230 exchanges information with an edge server 210 or edge service to detect blind spots of the second vehicle 200. In this manner, the sensors of the second vehicle are represented by 202 and the second vehicle's estimation of its own blind spots is represented by 204. The combined perception information 206 of the second vehicle is represented by 206. This combined perception information 206 may optionally include the second vehicle's estimation of its own blind spots 204. The second vehicle 200 may optionally send some or all of this combined perception information 206 to the edge server 210, and the edge server 210 may optionally use this information in blind spot detection. This perception information may be transmitted using any known wireless protocol; however, in an exemplary configuration, this transfer may take place using a vehicle to everything (V2X) protocol 212. The edge server 210 may store the transmitted combined perception information 206 in a memory 214.

The first vehicle 230 may seek to obtain information about blind spots of the second vehicle, or systems to compensate for blind spots of the second vehicle, and the first vehicle 230 may optionally request such information from the edge server 210. Alternatively or additionally, the edge server 210 may transmit (whether directly or via a broadcast) this information to the first vehicle 230, without specifically being prompted to do so. This transmission of stored blind spots as identified by the second vehicle 200 is represented by 216.

In some circumstances, it may be impossible or undesirable to obtain an estimation of the second vehicle's blind spots directly from the second vehicle. In such circumstances, it may be advantageous to derive the second vehicle's blind spots, subject to further refinement, by identifying a make and model (or otherwise a vehicle type) of the second vehicle. The actual correlation between make, model, and/or vehicle type and the corresponding blind spots may be performed in the edge server 210, or may alternatively be performed in the first vehicle 230, such as by sending a request for blind spot information (e.g. to a cloud server) or by determining the blind spot information using a vehicle identifier (e.g. make and model) and a locally-stored database.

The performance of this correlation within the edge server 210 will now be depicted. In this case, the edge server 210 may be equipped with one or more sensors 222, such as image sensors (e.g. cameras), lidar, radar, ultrasound, etc. The edge server may optionally be configured as an infrastructure element (e.g. a roadside element, which may be freestanding or connected to another roadside element such as a sign, traffic light, etc.). The edge server 210 may be configured to receive sensor information from 222 and to estimate the blind spots and/or visible regions of the second vehicle 200 based on the sensor data 222 and a vehicle database or look up table 224, comprising information about a plurality of vehicle models and their corresponding blind spots and/or visible regions.

Whether using the stored blind spot information 216 as received from the second vehicle 200, or using the blind spot information 220 as derived from the database or look up table of various vehicle models 224, the edge server 210 may be further configured to generate from this information a trajectory risk score 218, indicating a risk to the first vehicle 230 based on a probability of being within a blind spot of the second vehicle 200.

The first vehicle 230 may be configured to receive via an interface 232 with the edge server 210 (the interface optionally comprising a baseband modem and transceiver, configured to wirelessly receive and decode a transmission from the edge server 210) the information described above. The first vehicle 230 may include a risk assessment module 234, configured to determine information a probability that the first vehicle 230 is in a blind spot of the second vehicle 200. The first vehicle 230 may include a trajectory prediction risk assessment module 236, configured to determine a probability that the first vehicle 230 will enter a blind spot of the second vehicle 200. The risk assessment module 234 may send determinations of blind spots of the second vehicle 200 and/or risk information associated with those blind spots to one or more display units 238, such as one or more alternate realities/augmented reality displays, a headmounted display, a heads up display, or any other display on or external to the first vehicle 230. The risk assessment module 234 and/or the trajectory prediction risk assessment model 236, may send their data to an automated driving or planning module 240, which may utilize information about blind spots of the second vehicle 200 and/or risk associated with those blind spots for decision-making regarding future actions of the first vehicle 230.

Figure 3:
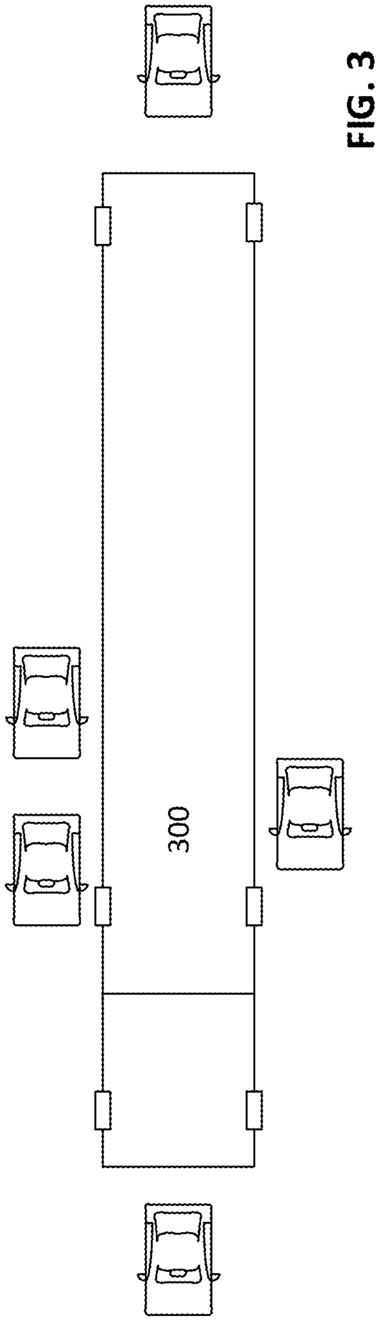
FIG. 3 depicts a tractor-trailer surrounded by vehicles.
Figure 4:
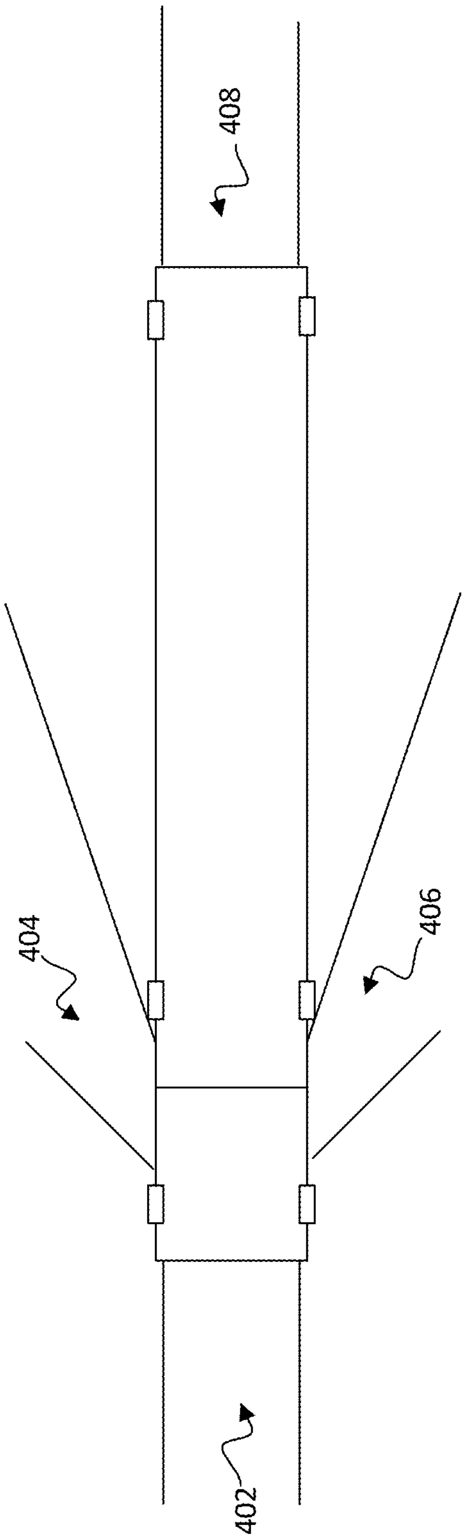
FIG. 4 depicts various blind spots by zones.

FIG. 3 depicts a tractor-trailer 300 surrounded by five vehicles. Each of these vehicles is in a commonly understood and well-accepted blind spot of the tractor-trailer. That is, the tractor-trailer 300 may be unable to see an area immediately in front of the tractor-trailer (such as due to a height differential and the driver's view being obstructed by the hood of the vehicle), areas behind the side mirrors and close to the sides of the vehicle, and areas directly behind the vehicle. Thus, a driver of the tractor-trailer may be unable to see any of the five vehicles depicted. FIG. 4 depicts these blind spots by identifying zones 402, 404, 406, and 408, in which the driver of the tractor-trailer could not see a nearby vehicle.

For the purposes of this disclosure, such blind spots will be referred to as generalized blind spot information. In this context, generalized blind spot information describes blind spots of a vehicle based on the vehicle's structure and/or chassis (e.g. blind spot information based on the database or lookup table, and without further refinement). That is, generalized blind spot information describes blind spots that are structurally inherent in the vehicle, unless they are compensated for, such as by using cameras or additional mirrors. Generalized blind spot information does not include increased blind spots (reduced visibility) based on additional factors (referred to herein as "context variables"), such as carrying a trailer, having a rear-mounted bike rack, over packing a vehicle's trunk such that the driver's views obstructed, or the like. Generalized blind spot information further does not include increased visibility resulting from camera, safety systems, and the like.

Various strategies exist for a first vehicle to ascertain one or more blind spots of a second vehicle. In a first strategy, the second vehicle may expressly communicate (e.g. through a wireless transmission) the second vehicle's visible regions and/or blind spots to an edge/cloud server, or alternatively directly to the first vehicle (whether a direct communication or a broadcast), such as described in FIG. 2, with respect to elements 212, 214, and 216. Should this system be used, the data transmitted (e.g. the identification of the blind spots) may be communicated in any of a variety of ways, depending on the given implementation. In one configuration, the data may be represented by a low complexity description of the geometrical regions corresponding to the blind spots. This may include parameterized basic shapes, such as cones or polyhedra. The geometrical regions may also be annotated with the location at which they is valid in the vehicle local coordinates (e.g., located at the center of the back of the car, or located at the front left and rotated 90° clockwise).

Using this strategy, each geometric region may be annotated with any (or any combination) of the following semantic information: (a) a binary value, which may differentiate, for a given area, whether the area corresponds to a blind spot or a visible region; (b) a sensor type, which may be or include a categorical value, which may determine whether the region belongs to the human visual region, camera region, radar, lidar, etc.; or (c) operational status, which may also be or include a categorical value, which may determine whether the region is currently valid or not due to malfunctioning or due to a degradation due to weather conditions.

Although this information may be transmitted in any format, and although any of a variety of different formats may be appropriate or desired for a given implementation, one exemplary format is depicted below. In this format, a region idea is labeled (region ID), defined by shape (geometric shape), oriented by position (position), defined in terms of its binary value (blind spot or visible area), defined by a relevant sensor type (e.g. camera or radar), and provided with a status (e.g. operational or non-operational).

| Region ID | Geometric shape | Position | Area Type | Sensor type | Status |
|---|---|---|---|---|---|
| 1 | Parameters (Vertex list) | Location (X, Y, Z); rotation (o, p, q) | Blind spot | Camera | Out of operation |
| 2 | Parameters (Vertex list) | | Visible region | Radar | Operational |
| . . . | | | | | |

In some circumstances, additional metadata may also be included, such as to encrypt the information, provide a timestamp, verify the integrity of the data, or authenticate the data. This may be performed, for example, using techniques such as (e.g., public keys, cyclic redundancy checks, using Global Positioning Data, etc.).

In other configurations, it may be impossible or undesirable to obtain the second vehicle's blind spots directly from the second vehicle or from the edge server as an intermediary (e.g. the second vehicle transmits the blind spots to the edge server, and the edge server transmits this information to the first vehicle). In such circumstances, it may be preferable for the first vehicle to make its own determination of the second vehicle's blind spots, such as by using a database or lookup table, or by requesting that an edge server or cloud server perform this determination.

For most vehicles, the information necessary to estimate the blind spots of the second vehicle can be easily obtained by taking advantage of the fact that there are a finite number of vehicle models that are authorized for road use. Thus, a model corresponding to the second vehicle can be obtained from a database or look-up table that includes a plurality of models of vehicles approved for road use. In this manner, the first vehicle may obtain or detect information about the second vehicle that permits the first vehicle to look up and receive a corresponding model of the second vehicle from the database or look-up table. For example, the first vehicle may detect a make and model of the second vehicle by detecting the name of the make and/or model in image sensor data representing an image of the second vehicle. Additionally or alternatively, the first vehicle may detect sufficient information about the shape and/or size of the second vehicle through sensor data. This may be through sensors capable of obtaining three-dimensional or depth data, such as by using a Light Detection and Ranging (lidar) or certain high-resolution Radio Detection and Ranging (radar) techniques. Alternatively or additionally, the first vehicle may use a depth camera or stereo camera, or may obtain depth information using a plurality of two-dimensional images and a photogrammetry technique.

The first vehicle may optionally be equipped with an artificial neural network, which may be configured to recognize a type (e.g. a make and/or model) of the second vehicle based on sensor data. In this manner, the first vehicle may be configured to obtain one or more images of the second vehicle (e.g. using image sensor data), and the artificial neural network may be configured to determine a make or model of the second vehicle based on the sensor data. In some configurations, the analysis of the second vehicle may be performed using other types of sensor data, such as lidar data, radar data, ultrasound data, or otherwise. Once the make and model has been identified, the generalized blind spots may be obtained from a database or lookup table as described herein. Alternatively or additionally, the artificial neural network may be configured not to obtain a make and model of the second vehicle and to look up the make and model in a database or look up table, but also to determine directly from sensor data the generalized blind spots of the second vehicle. Such an artificial neural network may include, for example, a convolutional neural network trained to recognize vehicle types. In this manner, the artificial neural network may utilize a classification model to determine whether a vehicle on the road corresponds to one or more predetermined vehicle models.

The model (e.g. a 3D model) of a vehicle chassis of the second vehicle, obtained as described above using sensor data and the database, may include most of the necessary information to estimate the visibility of the second vehicle's human driver, such information including any of height, length, width, window sizes, pillar information, etc. Using this model, the device for blind spot detection may use a ray tracing procedure to determine blind spot regions where there is no visibility from the driver's seat. In this manner, an approximate location of the driver's eyes is determined (e.g. based on an average human height from the location of the driver's seat), and the ray tracing procedure generates areas of visibility extending outward from the driver's eyes, taking into account obstacles (e.g. opaque structures, such as vehicle supports), reflective/refractive surfaces (e.g. mirrors), and optionally any additional blind spot compensation systems present in the second vehicle (e.g. camera monitors depicting areas that would otherwise be in blind spots). It is noted that wherever ray tracing is discussed herein, it may be alternatively possible to use a ray casting procedure.

Figure 5A:
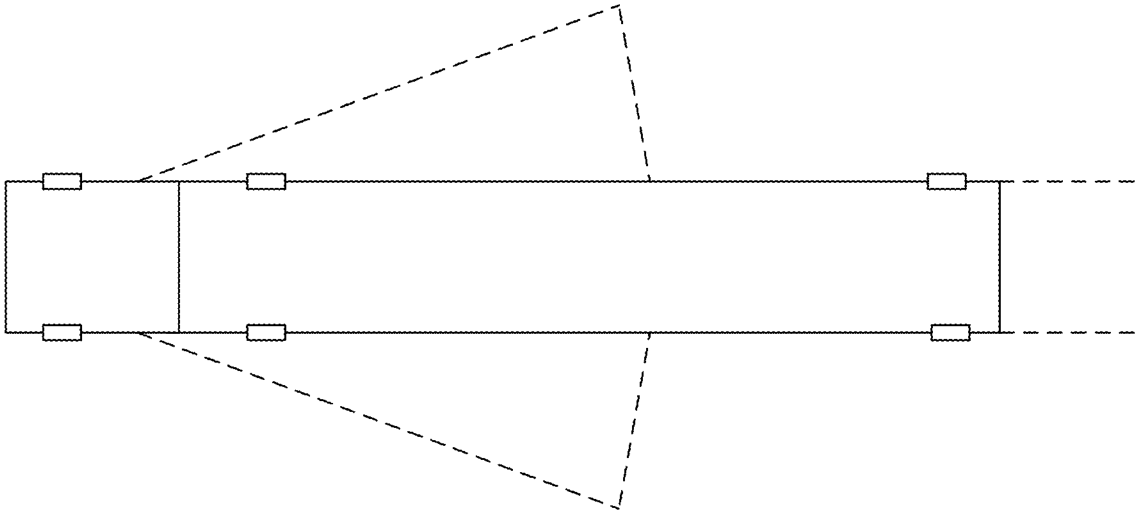
FIG. 5A depicts an aerial view of a tractor-trailer and its blind spots.
Figure 5B:
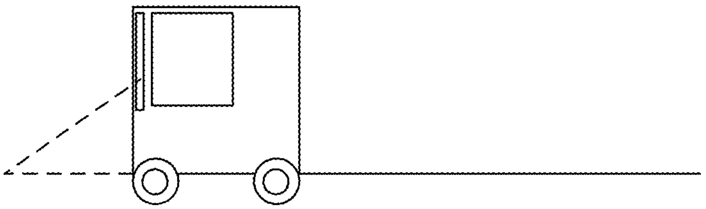
FIG. 5B depicts blind spots of the tractor-trailer extending from its cab.

Since, blind spot areas depend on the geometry and design of the second vehicle (and to some extent also the geometry and design of the first vehicle), the following will describe static information that can be relevant for the computation of the blind spots. Such static information may be obtained offline (e.g., before deployment of the service, or during maintenance and updates). FIGS. 5A and 5B depicts a ray tracing procedure to determine blind spots based on a vehicle's physical configuration. In FIG. 5A, and aerial view of a tractor-trailer is depicted, in which a ray tracing procedure is performed. The driver relies on side mirrors to view the area alongside the body of the tractor-trailer. Although the side mirrors provide considerable visualization, they may not provide visualization of all areas close to, and along the sides of, the tractor-trailer. A ray tracing procedure is performed to depict blind spots in this area, which are delineated by the dashed lines extending from the driver's cab to the middle of the vehicle. This considers that the driver's view is essentially limited to that which the driver can directly visualize outside of the windows, along with visualization that is made possible by the side mirrors.

Depending on the configuration, the ray tracing procedure may consider a blind spot to exist anywhere where there is not direct visualization through the side windows, and then to reduce these blind spots by any area for which the side mirrors provide visualization. The remaining blind spots are indicated by the dashed lines. Similarly, tractor-trailers rarely have visualization directly behind the tractor-trailer, such as through a rearview mirror. Typically, there is an area directly behind the tractor-trailer for which the driver has no visualization whatsoever unless such visualization is made possible by external cameras. This area is depicted by the dashed lines behind the vehicle in FIG. 5A. Turning to FIG. 5B, the ray tracing procedure may consider the driver's visualization through the front window, and in particular that the driver may be unable to visualize an area directly beneath and extending slightly forward away from the front windshield. This is depicted by the dashed lines in FIG. 5B.

Although this ray tracing procedure may provide useful information, certain variables or configurable elements within the second vehicle may introduce an uncertainty into the determination of blind spots, which should be taken into account. Such variables may include, but are not limited to, a size or height of the driver of the second vehicle, a height of the driver's seat in the second vehicle, mirror orientations in the second vehicle, and the like.

Beyond obtaining the above static information (e.g. based on the model and the ray tracing procedures), additional information (context variables) related to potential deviations from the static information (e.g., if a vehicle contains a relevant modification, such as the inclusion of bike rack, caravan or trailer) can be extracted by perception and will be discussed in detail below.

In some circumstances, the actual second vehicle may diverge somewhat from the corresponding model, and the blind spot detector and/or corresponding artificial neural network, if utilized, may be configured to modify the generalized blind spot information based on any observed differences. Such observed differences are also included in the context variables described herein and may include, but are not limited to, changes in mirrors or mirror appendages (e.g. missing mirrors, non-factory mirror holders or braces), translucent or opaque additions (e.g. stickers or other objects) added within a driver's line of sight, carrying of a trailer, carrying of a rear-mounted bicycle rack, or over-packing the truck such that the driver's vision through the rear-view mirror is obscured.

Figure 6A:
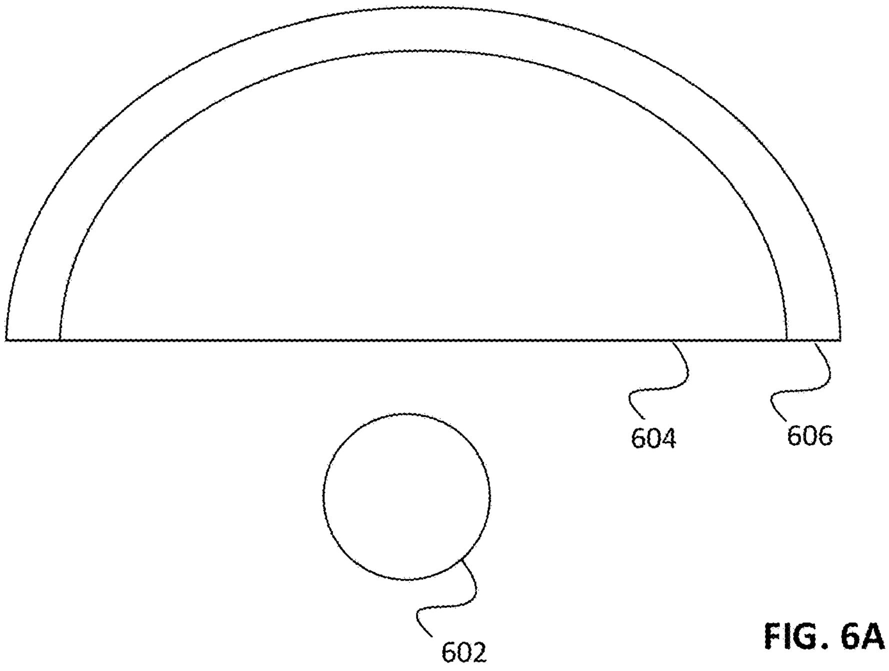
FIG. 6A depicts a limited field of view due to a motorcycle helmet.

Should the second vehicle be a motorcycle, alternative or additional considerations may be necessary. A motorcyclist's field of view (FOV) can increase of decrease the blind spots that may otherwise be associated with the motorcycle. For example, a typical helmet obstructs some of the vision to provide protection, and therefore a motorcyclist with a conventional helmet may have a significantly reduced FOV compared to a motorcyclist without a helmet. This limited FOV due to a motorcycle helmet is depicted in FIG. 6A, in which the motorcycle driver's head is represented by 602, and the resulting FOV for the helmet is depicted as 606 (which includes the area represented by 604 as well). As is described elsewhere in this disclosure, variables such as the driver's head size, eye height, helmet opening size, position of the helmet relative to the head, etc., may further reduce the driver's FOV. As a result, the blind spot detector may optionally be configured to assume a further reduced FOV, or in certain circumstances, to assume a worst-case scenario with respect to the FOV. This limited FOV resulting from these variables is depicted as 604. That is, although the helmet itself may permit a FOV corresponding with 606, the blind spot detector may assume a FOV of 604 to account for the above variables. The difference between 606 and 604 may be as many as 20 degrees. Depending on the implementation, a number between 0 degrees and 20 degrees may be selected.

Figure 6B:
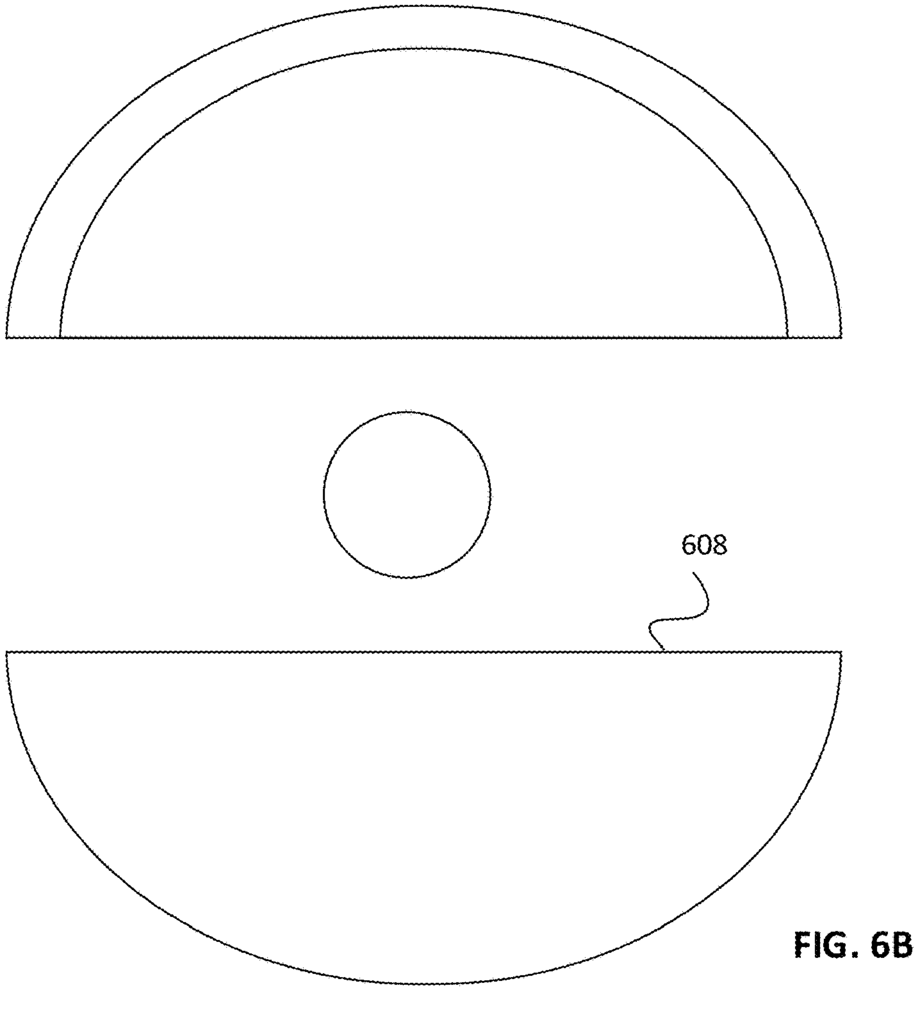
FIG. 6B depicts a field of view resulting from an advanced helmet.

However, certain advanced helmets may include embedded rear cameras together with one or more head-up displays, which may be capable of providing as much as a 360° FOV, or in any event, a substantially greater FOV than depicted in FIG. 6A. FIG. 6B depicts the FOV resulting from such an advanced helmet. In this figure, the driver has the FOV as depicted in FIG. 6A, as well as 180 degrees of rear FOV 608. Naturally, the amount of rear FOV may vary depending on the variables mentioned above, and also depending on the capabilities of the helmet. In this manner, the recognition of whether a motorcyclist is wearing helmet and, if so, whether the helmet is an advanced helmet that includes additional circuitry to increase the FOV may be crucial to understanding the second vehicle's blind spots. This increased FOV from an advanced helmet is also included in the context variables that are to be used to adjust the blind spots from a model.

Thus, the blind spot detector may be configured to identify the presence or absence of a helmet on a motorcyclist's head. As with the detection of a vehicle, the blind spot detector may further include an artificial neural network, which may be configured to determine from sensor data whether a motorcyclist is wearing a helmet. The artificial neural network may alternatively or additionally be configured to determine what model of helmet the motorcyclist is wearing.

The blind spot detector may utilize a database or lookup table to identify the FOV of the type of helmet identified on the second driver. In this manner, the blind spot detector may identify a type of helmet and identify, based on the type of helmet, a corresponding field of vision for the driver of the second vehicle. Should the particular type of helmet be unidentifiable, the blind spot detector may be configured to utilize a basic assumption model, in which a set of basic FOV configurations is assumed, and these may be further the configurable based on additional factors, as will be described herein.

In addition to the typical vehicle and/or helmet models, it is useful to provide a database or lookup table of classification models that can provide additional information about common vehicle variations based on the context variables. That is, certain variations or anomalies (context variables) may alter or diminish a driver's FOV, and the blind spot detector may be configured to determine these variations or anomalies and to calculate the altered FOV based on the detected variations or anomalies. Such variations or anomalies (context variables) may include, but are not limited to, when the trunk is sufficiently loaded so as to obstruct a view through the rear window; if the vehicle has a trailer or caravan attached; if the vehicle has a bike rack attached on its rear; or if the vehicle has a missing mirror. Such variations or anomalies may be readily identifiable within sensor data, and the generalized FOV for the corresponding vehicle may be further altered to account for these variations or anomalies.

As an example, a first vehicle encounters a second vehicle and obtains sensor information of the second vehicle, such as image sensor data or lidar data. Based on the sensor information, the first vehicle utilizes an artificial neural network to determine the model of vehicle. Using the sensor data, the artificial neural network determines that the vehicle is a VW 1980 T-Model. The blind spot detector retrieves configuration data about this vehicle. The configuration data may include a list of the blind spots themselves, or merely structural data about the vehicle from which the blind spots may be determined using a ray tracing procedure. The artificial neural network may further identify a context variable—in this case, that the second vehicle's right passenger side mirror is missing, and the blind spot detector may be configured to amend the detected blind spot information so as to indicate an additional blind spot arising from the lack of the corresponding mirror. In this manner, the blind spot detector has obtained blind spot information about the second vehicle and has further refined the blind spot information based on a particular condition or feature of the second vehicle.

For any of the above-described anomalies or variations, the blind spot detector may include a 3D model corresponding to the particular anomaly or variation (context variable), which may be used to modify the generalized model of the vehicle. For example, if the second vehicle is determined to have a rear-mounted bike rack, the first vehicle may obtain the corresponding model for the rear-mounted bike rack, and it may use this model to modify the generalized model of the second vehicle, so as to show the reduced visibility (e.g. increased blind spot) resulting from the presence of the rear-mounted bike rack.

Ongoing environmental perception may be necessary for the computation of blind spots as described herein. Such environmental perception may be carried out using one or more sensors, which themselves may correspond to one or more sensor types. Such sensor types may include, but are not limited to, image sensors (e.g. cameras), lidar, radar, ultrasound, or otherwise. The first vehicle may be configured to perform continuous or semi-continuous perception of its environment and to use the gathered sensor data to make determinations of blind spots as described herein.

Beyond obtaining sensor data of the shape or configuration of the second vehicle, such continuous or semi-continuous environmental perception may further include determining location data of the second vehicle. The location data may include an absolute location of the second vehicle and/or a location of the second vehicle relative to the first vehicle. Such location data may be determined using a variety of techniques. In a first technique, the first vehicle generates a digital twin of the second vehicle and the road on which the first vehicle and second vehicle are traveling. Using distance determinations and/or landmarks, a location of the second vehicle relative to the first vehicle may be obtained. Alternatively or additionally, the second vehicle may determine its own absolute position, such as using a positioning system like the Global Positioning System, and to transmit this absolute position to the first vehicle. Such transmission may be a direct transmission, such as by using a V2X or V2V communication method, or such a transmission may be indirect, such as by transmitting the second vehicle's location to an infrastructure or edge server, which may then transmit the information further to the first vehicle.

As described above, the first vehicle must first classify the vehicle to obtain generalized information about the vehicle from the database or lookup table. This classification may be performed, as described above, by analyzing sensor data and/or by utilizing an artificial neural network. Once the second vehicle is determined, the database or lookup table may provide either structural information of the vehicle (from which the first vehicle may determine the second vehicle's blind spots, such as by using a ray tracing technique), or information about the second vehicle's blind spots.

Once the information about the second vehicle's blind spots is determined (whether through the ray tracing technique based on structural information, or whether by obtaining this information directly from the database or lookup table), the following analyses may be performed to further refine the blind spot information.

First, additional information (context variables) may be obtained to identify or rule out any modifications or anomalies that may change the second vehicle's blind spots. As stated above, this may include the identification of additional obstructions, missing mirrors, the presence of a trailer or caravan, the presence of a rear-mounted bicycle rack, the overloading of a trunk so as to impair visibility, or any other such factor that may change the second vehicle's blind spots.

Of note, the raw data necessary to perform this step may already be available such as through the use of a digital twin. Many vehicle navigation systems will generate a digital twin of the second vehicle as part of the vehicle's ongoing processing of the first vehicle's surroundings or environment. This digital twin may already include the modifications or anomalies as described above. For example, the digital twin may already include the presence of a trailer or caravan. Should the digital twin include insufficient information, or should it be determined that the digital twin will only identify certain anomalies, but not others, then it may be necessary or desirable to utilize sensor data (image sensor data, lidar, radar, ultrasound, or otherwise) to determine the presence or absence of other such modifications or anomalies. These image sensor data may be fed to a model classifier and/or to a variation classifier. The result of this step may then be a label for the second vehicle that matched the second vehicle to a known element in the database and augments it with information about deviations or extensions.

In one configuration, the first vehicle may be configured to determine the second vehicle's blind spots after gathering the perception information as described above. By knowing the road agent instance, the first vehicle may perform a query in which the first vehicle retrieves data to compute the blind spots. For example, if a vehicle is identified as a VW 1980's T-Model, the corresponding 3D model may be obtained. The detected variations/modifications to the corresponding model are then used to modify the model. For example, if a trailer is attached to the vehicle, then the trailer 3D model is added as part of the vehicle at the location where it has been detected. The 3D model is then analyzed to estimate the blind spot regions. This can be achieved very accurately by using a ray tracing approach.

Figure 7:
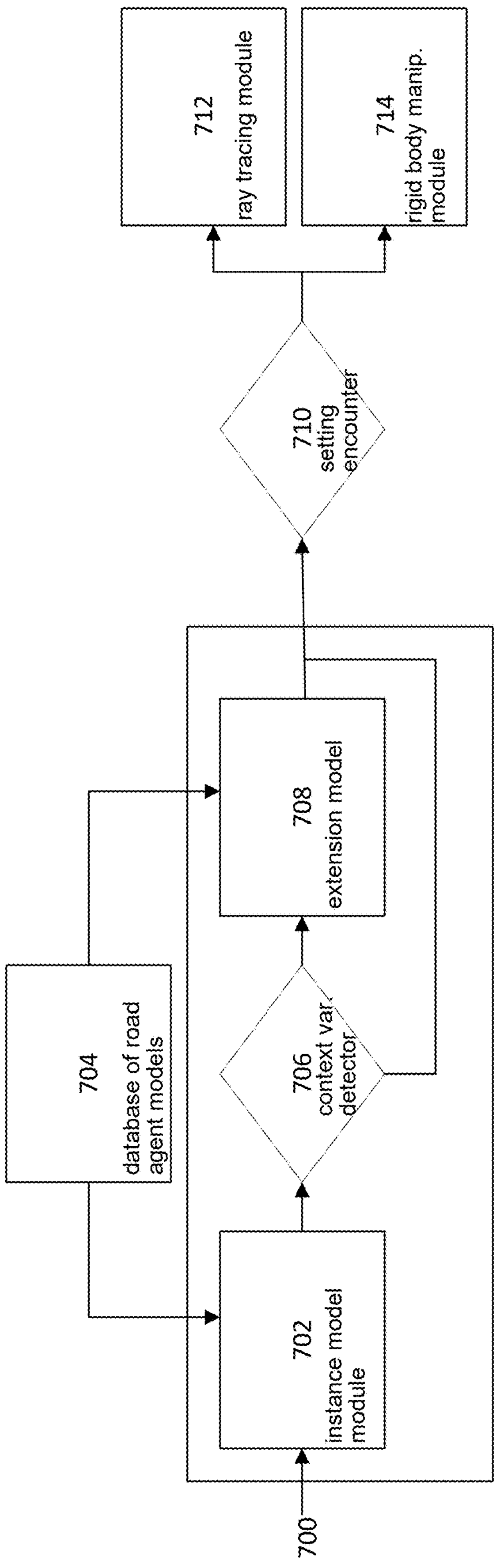
FIG. 7 depicts a ray tracing procedure.

This procedure is depicted in FIG. 7. According to this figure, the determination of the second vehicle's blind spots begins with a determination of the second vehicle's instance (e.g. make and model) 700. Once the instance 700 is known, the blind spot detector may send a request to the instance model module 702, which may receive an instance model from a database of road agent models 704. This database may be on-site (e.g. offline), in an edge computer, a cloud computer, or otherwise. The instance model may include blind spot areas and/or visualization areas relative to the second vehicle. The instance model may be configured as a vehicle (e.g. as a 3-D model of the second vehicle in which blind spots or visualization areas are depicted, such as with polygons), a series of 2-D models (similarly depicting the blind spots or visualization areas using polygons), or as a table (e.g., specifying the size, shape, location, and orientation of the blind spots or visualization areas, such as relative to the second vehicle).

Once the instance model is obtained, the blind spot detector may detect the presence of any context variables, such as with the context variable (extension) detector 706. The context variables/extensions in this context refer to factors that may change the blind spots of the second vehicle from those as defined in the instance model. As described above, such context variables/extensions include, but are not limited to, the absence of an expected mirror, the presence of a trailer, the presence of a rear-mounted bicycle rack, the over packing of a trunk such that visualization through the rear window is impaired, and the like. Should an context variable/extension be detected, the extension model module 708 may receive a corresponding extension model from the database of road agent models 704. This process may be repeated for as many extensions as are detected.

At 710, a setting is encountered which influences the next step of blind spot detection. On one hand, very accurate blind spot detection may be performed in the ray tracing module 712. In this module, the resulting instance model, optionally as expanded by the detected one or more extensions, is subject to ray tracing. The resulting ray tracing depicts blind spots and/or areas of visualization to a high degree of accuracy. Owing to its accuracy, however, this ray tracing procedure may be computationally rigorous and thereby relatively slow.

In certain circumstances, it may be desired to perform a blind spot determination with particularly low latency, and it may be acceptable to forgo some degree of accuracy to meet the necessary latency goals. Should it be acceptable to increase computational speed and to accept the trade-off of decreased accuracy, then the blind spot detector may use the rigid body manipulation module 714 to perform rigid body manipulation of precomputed blind spots. That is, precomputed blind spots corresponding to the instance model and/or the extensions may be rotated or resized as necessary to create an estimation of the second vehicle's blind spots.

In an optional configuration, the first vehicle may be configured to track one or more movements of the second vehicle following blind spot detection. In this manner, the first vehicle may avoid re-computing the second vehicle's blind spots by using the tracking movements to update the locations of the geometric areas corresponding to the second vehicle's blind spots.

In a further optional configuration, the first vehicle may be configured to record of past movements and/or trajectory of the second vehicle, and to utilize a predictive model to predict future movements and/or trajectory of the second vehicle based on one or more historical movements and/or trajectory of the second vehicle. In this manner, and by predicting the future movement and/or trajectory of the second vehicle, the first vehicle may also predict a future location of the second vehicle's blind spot. The first vehicle may then determine a probability of being within the second vehicle's predicted blind spot at a future point in time. Alternatively or additionally, the first vehicle may be configured to send or broadcast the prediction of the locations of the second vehicle's future blind spot to one or more third vehicles. Such a transmission may be performed according to any wireless transmission protocol. In one exemplary configuration, the first vehicle may be configured to send the prediction via a V2X transmission protocol. To obtain the potential trajectories of the second vehicle, the first vehicle and/or the blind spot detector may utilize any known technique. On such technique, according to an exemplary configuration, may be a maneuver coordination mechanism, for example a Maneuver Coordination Service TS 103 561 according to the European Telecommunications Standards Institute (ETSI) and/or through any other trajectory estimation procedure. As with other predictive aspects of this disclosure, the maneuver prediction may be an estimated or stochastic prediction. In this manner, the maneuver prediction may not be binary (e.g. not a 0 or 1), but may rather be associated with a confidence value between 0 and 1.

Figure 8:
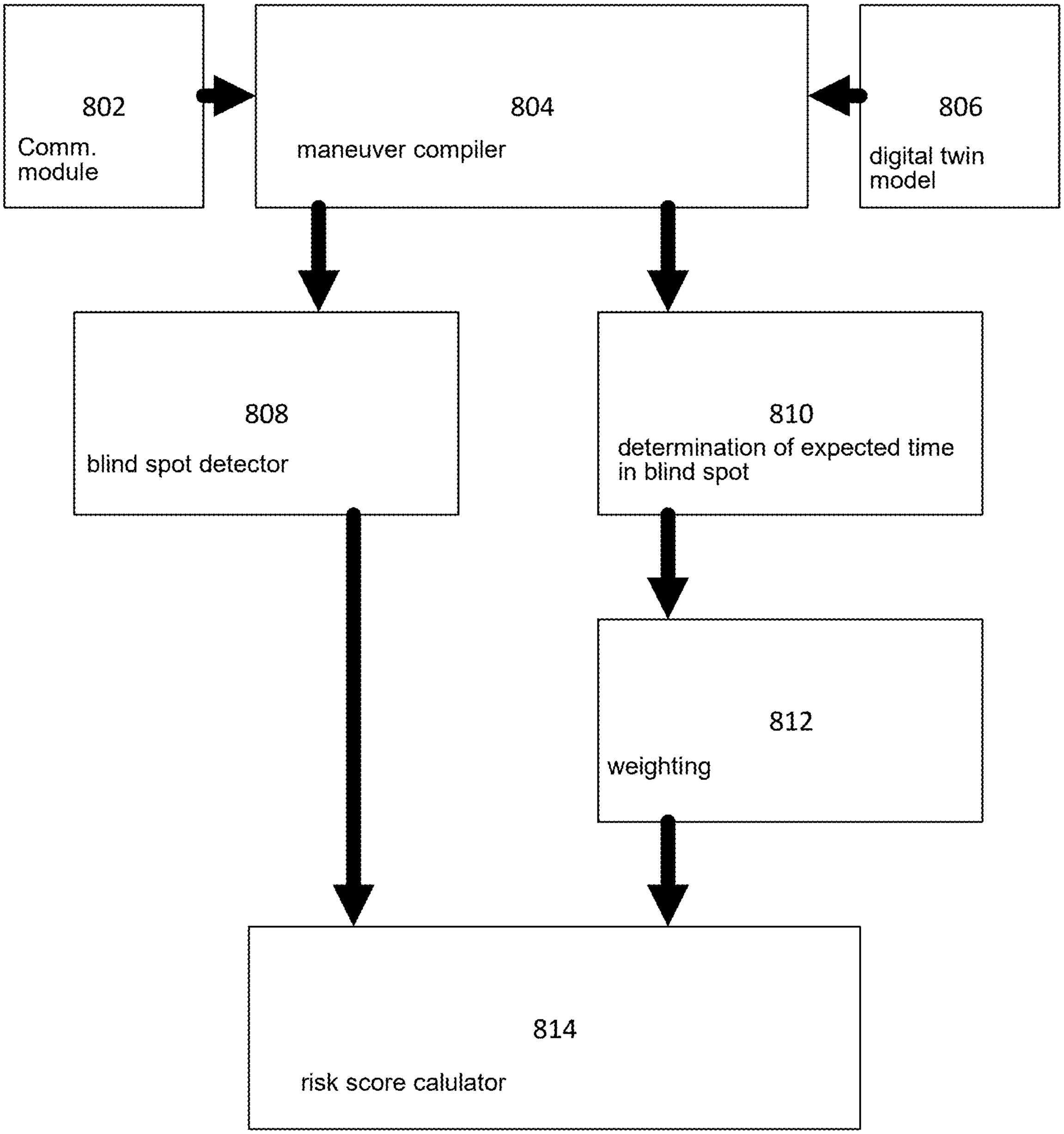
FIG. 8 depicts the determination of trajectory risk score.

FIG. 8 depicts the determination of trajectory risk score. In this figure, a communication module 802 may receive transmissions (e.g. such as vehicle to everything (V2X) transmissions and/or transmissions under ETSI TS 103 561, above) of the second vehicle's maneuvers. The maneuver compiler 804 may receive these transmissions from the communication module 802 and/or from a digital twin model 806, such as for navigation and/or as described above. At 808, the blind spot detector determines a likelihood of the second vehicle performing a given maneuver, such as by using historical maneuver data. At 810, the blind spot detector utilizes the trajectory of the second vehicle to determine the time expected to be spent in the second vehicle's blind spot. Should it be determined that the first vehicle is likely to be in a blind spot of the second vehicle, then the blind spot detector may weight the significance of this time in the second vehicle's blind spot in 812. Finally, taking into account the likelihood of the second vehicle's maneuvers at 808 and the weighted importance of blind spot occupancy at 812, the blind spot detector may calculate a risk score 814 associated with the first vehicle likely entering a blind spot of the second vehicle for a particular length of time.

According to an aspect of the disclosure, the results of the blind spot estimation may be probabilistic, such as due to uncertainties in unobservable configurable parameters of the vehicles. These may include, but are not limited to, seat height, mirror orientation, or the uncertainty associated with prediction of a future trajectory. Thus, the computed blind spot areas, once such factors are taken into account, are not binary (visible, not visible), but instead may be indicated by a real value from 0 to 1, which may indicate the confidence of estimation. In this manner, 1 may indicate 100% confidence of a spatial region being a blind spot, and 0 may indicate 0% confidence. Of course, the opposite may be true, in which a higher score could alternatively be associated with a lower level of confidence, if desired.

Using this probabilistic method, it may be desirable to notify the human agent (e.g., a driver of the first vehicle) only when the probability of a detected blind spot is outside of a particular range. For example, the blind spot detector may be configured to not notify the human agent of a detected blind spot if the probability of the area corresponding to an actual blind spot is within a first range, and to notify the human agent if the probability of the detected blind spot corresponding to an actual blind spot is within a second range. The first range and the second range may be configured in any manner, depending on the implementation. In an exemplary configuration, the first range may be configured as 0 to 50% probability, and the second exemplary range may be configured as anything above 50%.

One exemplary method of communicating the detected blind spot to a human agent is through the use of an augmented reality display. In this manner, the blind spots and/or visual regions that were transmitted by the vehicles or estimated by the edge service can be presented for a driver of the first vehicle in the driver's augmented reality display.

In one configuration, the blind spot information may be displayed as transparent flat shadows on the road. In this manner, first vehicle driver may specify how much information the driver would like to see. For example, the driver may elect to be shown only the blind spots of the closest vehicles, as opposed to all vehicles. Alternatively or additionally, the driver may elect to see only the blind spots of vehicles for which a particular risk to the first vehicle is estimated. Alternatively or additionally, the driver may elect to see only the blind spots of vehicles for which an explicit exchange of information has occurred between the first vehicle and the second vehicle.

If the first vehicle does not include an alternate/augmented reality headset or a suitable display (e.g. a heads up display), one or more signals may be utilized indicate to the first vehicle driver that the driver is located within the estimated blind spot of the second vehicle. Such a signal may include an auditory signal, such as a beep, and/or a visual signal, such as a blinking light.

In an exemplary configuration, the blind spot detector may be configured to calculate or estimate time spent in the second vehicle's blind spot(s). In this manner, the blind spot detector may analyze a trajectory of the first vehicle relative to a trajectory of the second vehicle, taking into account the second vehicle's predicted blind spots, in this manner, the blind spot detector may determine when, and for how long, the first vehicle is within the second vehicle's blind spots. The blind spot detector may track an absolute value of the time spent in the second vehicle's blind spots. The blind spot detector may be configured to weight time spent in the second vehicle's blind spots such that brief periods of time spent in the second vehicle's blind spots are associated with a lower risk and lengthier times spent in the second vehicle's blind spots. This may correspond to the fact that any maneuver of the second vehicle in which the second vehicle would unintentionally may contact with the first vehicle requires a certain duration of time. If the first vehicle is present in the second vehicle's blind spot only for a short duration of time, then the second vehicle may be expected to see the first vehicle before completion of the maneuver that would otherwise lead to contact between the first vehicle and the second vehicle. In contrast, if the first vehicle is present in the second vehicle's blind spot for a lengthy period of time, it may be expected that the second vehicle will complete its maneuver that would otherwise result in contact between the vehicles before the second vehicle is able to visualize the first vehicle.

Using this weighted determination, the blind spot detector of the first vehicle may be configured to generate a risk score, associated with the presence of the first vehicle within a blind spot of the second vehicle. The blind spot detector may be configured to transmit this risk score to any other system of the first vehicle, such as a navigation system of the first vehicle, from which additional driving decisions may be made. Alternatively or additionally, the first vehicle may be configured to transmit this risk score to any other vehicle in a vicinity of the first vehicle, so as to inform nearby vehicles of a risk of a collision.

Figure 9:
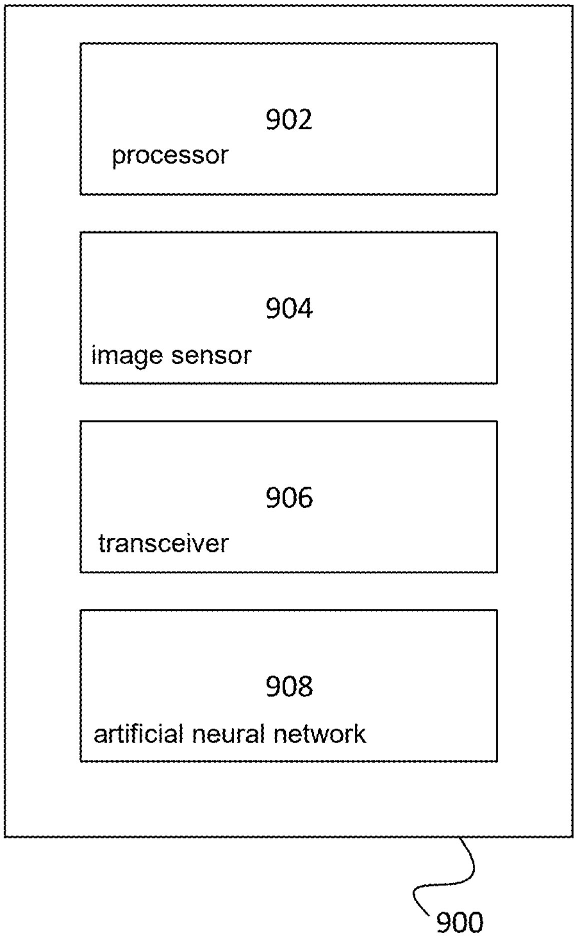
FIG. 9 depicts a device for blind spot determination.

FIG. 9 depicts a device 900 for blind spot determination of a second vehicle in a vicinity of a first vehicle. The device 900 may include a processor 902, which may be configured to determine one or more context variables associated with the second vehicle; modify a model of the second vehicle based on one or more context variables; and determine a probability of the first vehicle being within an area of limited visibility in the modified model. The device 900 may further include an image sensor 904, which may be configured to generate image sensor data representing an image of the second vehicle. In this manner, the processor may be configured to determine the one or more context variables from the image sensor data. The device may further include a transceiver 906, which may be configured to receive a wireless signal representing wireless transmission data. In this manner, the processor 902 may be configured to determine the one or more context variables from the wireless transmission data. In the case of a transceiver 906, the wireless transmission data may include sensor data from an edge server and/or an infrastructure unit.

As stated above, the device 900 may include an image sensor 904, which may be configured to generate image sensor data representing an image of the second vehicle. In this manner, the processor 902 may be further configured to determine a vehicle configuration of the second vehicle using the image sensor data, and to select a stored model from a plurality of stored models as the model of the second vehicle based on the determined vehicle configuration. In so doing, modifying the model of the second vehicle may include modifying the selected stored model. The device 900 may further include an artificial neural network 910, which may be configured to receive the image sensor data and to output an identifier of the second vehicle based on the image sensor data. In this manner, the processor 902 determining a vehicle configuration of the second vehicle using the image sensor data may include the processor selecting the stored model based on the identifier that is output from the artificial neural network 908.

Figure 10:
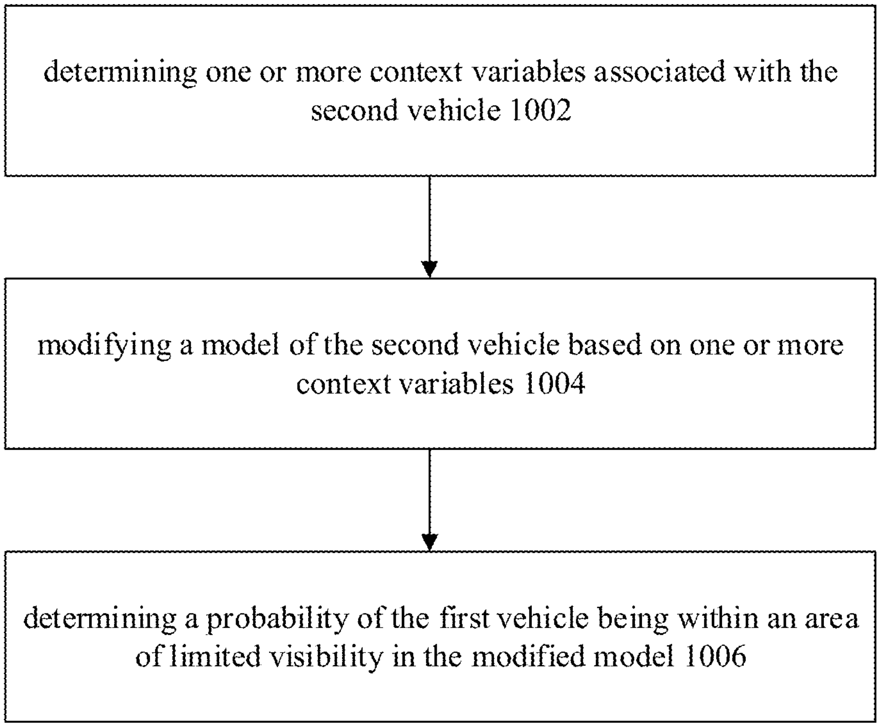
FIG. 10 depicts a method of blind spot detection.

FIG. 10 depicts a method of blind spot determination of a second vehicle in a vicinity of a first vehicle, including: determining one or more context variables associated with the second vehicle 1002; modifying a model of the second vehicle based on one or more context variables 1004; and determining a probability of the first vehicle being within an area of limited visibility in the modified model 1004.

Further aspects of the disclosure will be provided by way of Example:

In Example 1, a device for blind spot determination of a second vehicle in a vicinity of a first vehicle, including a processor, configured to determine one or more context variables associated with the second vehicle; modify a model of the second vehicle based on one or more context variables; and determine a probability of the first vehicle being within an area of limited visibility in the modified model.

In Example 2, the device of Example 1, further including an image sensor, configured to generate image sensor data representing an image of the second vehicle; and wherein the processor is configured to determine the one or more context variables from the image sensor data.

In Example 3, the device of Example 1 or 2, further including a transceiver, configured to receive a wireless signal representing wireless transmission data; and wherein the processor is configured to determine the one or more context variables from the wireless transmission data.

In Example 4, the device of Example 3, wherein the wireless transmission data include sensor data from an edge server and/or an infrastructure unit.

In Example 5, the device of any one of Examples 1 to 4, wherein the one or more context variables include any of sensor type and placement on the second vehicle; sensor operability; whether driver visibility via a rear-view mirror is obstructed by one or more objects within the second vehicle; whether a trailer is attached to the second vehicle; whether a bicycle rack is attached to the second vehicle; or whether a mirror is missing from the second vehicle.

In Example 6, the device of any one of Examples 1 to 5, further including an image sensor, configured to generate image sensor data representing an image of the second vehicle, wherein the processor is further configured to determine a vehicle configuration of the second vehicle using the image sensor data, and to select a stored model from a plurality of stored models as the model of the second vehicle based on the determined vehicle configuration; and wherein modifying the model of the second vehicle includes modifying the selected stored model.

In Example 7, the device of Example 6, wherein the processor determining the vehicle configuration of the second vehicle using the image sensor data includes the processor detecting from the image sensor data an identifier of the second vehicle and selecting the stored model based on the identifier.

In Example 8, the device of Example 7, wherein the identifier includes a make of the second vehicle, a model of the second vehicle, a chassis type of the second vehicle, or a vehicle identification number (VIN) of the second vehicle.

In Example 9, the device of Example 6, further including an artificial neural network, configured to receive the image sensor data and to output an identifier of the second vehicle based on the image sensor data; and wherein the processor determining a vehicle configuration of the second vehicle using the image sensor data includes the processor selecting the stored model based on the identifier that is output from the artificial neural network.

In Example 10, the device of any one of Examples 1 to 9, further including:

a transceiver, configured to receive a wireless signal representing the model of the second vehicle.

In Example 11, the device of Example 1 or 10, wherein determining the probability of the first vehicle being within the area of limited visibility in the modified model includes determining the area of limited visibility based on one or more structures of the second vehicle and the one or more context variables.

In Example 12, the device of Example 11, wherein determining the area of limited visibility based on one or more structures of the second vehicle and the one or more context variables includes performing one or more ray tracing procedures to define the area of limited visibility based on the one or more structures of the second vehicle and the one or more context variables.

In Example 13, the device of Examples 11 or 12, wherein the processor determining the probability of the first vehicle being within the area of limited visibility in the modified model includes the processor generating a statistical probability of limited visibility based on the model of the second vehicle as modified by any of mirror position, driver seat position, driver body dimensions, window dimensions and placement, or pillar dimension and placement.

In Example 14, the device of any one of Examples 1 to 13, wherein the processor determining the probability of the first vehicle being within the area of limited visibility in the modified model includes the processor assigning a probability of limited visibility to a region relative to the second vehicle and determining whether the first vehicle is present in the region.

In Example 15, the device of any one of Examples 1 to 14, wherein the processor determining the probability of the first vehicle being within the area of limited visibility in the modified model includes the processor assigning a probability of limited visibility to a region relative to the second vehicle and determining from a trajectory of the second vehicle and a trajectory of the first vehicle whether the first vehicle is likely to be present in the region at a future point in time.

In Example 16, the device of Example 15, wherein the processor is configured to determine the trajectory from a direction and speed of the second vehicle.

In Example 17, the device of Example 16, wherein the processor is further configured to determine the trajectory from one or more previous actions of the second vehicle.

In Example 18, the device of Example 15, wherein the processor is configured to determine the trajectory from a wireless communication with the second vehicle.

In Example 19, the device of Example 18, wherein the wireless communication is a vehicle-to-everything (V2X) communication.

In Example 20, the device of any one of Examples 1 to 19, wherein the processor is further configured to send a signal representing a warning or an instruction to generate a warning if the probability of the first vehicle being within an area of limited visibility is greater than a predetermined threshold.

In Example 21, the device of Example 20, wherein the warning is an auditory warning, a visual warning, or a haptic warning.

In Example 22, the device of any one of Examples 1 to 21, wherein the second vehicle is a motorcycle and wherein the one or more context variables include a type of helmet of a driver of the second vehicle; and wherein modifying the model of the second vehicle based on the one or more context variables includes limiting an area of visibility to a first region when the helmet of the driver is of a first type, and limiting an area of visibility to a second region, greater than the first region, when the helmet of the driver is of a second type.

In Example 23, the device of any one of Examples 1 to 22, wherein the model of the second vehicle or a transmission from the second vehicle includes information about how a driver of the second vehicle is notified of a presence of a vehicle in an area of limited visibility of the second vehicle; and wherein the processor is further configured to determine a response to a probability of the first vehicle entering an area of limited visibility of the second vehicle based on the information about how a driver of the second vehicle is notified of the presence of a vehicle in an area of limited visibility of the second vehicle.

In Example 24, the device of any one of Examples 1 to 23, wherein the processor is further configured to estimate a risk to the first vehicle of being in an area of limited visibility of the second vehicle.

In Example 25, the device of Example 24, wherein the processor is configured to determine the probability as a function of time spent in an area of limited visibility of the second vehicle.

In Example 26, the device of Example 24 or 25, wherein the processor is configured to weight the estimated risk based on whether the first vehicle is in an area of limited visibility of the second vehicle during a period that is critical to a sensor modality or a maneuver.

In Example 27, the device of any one of Examples 24 to 26, wherein the processor is configured to estimate a severity of damage or injury for a collision that results when the first vehicle is in an area of limited visibility of the second vehicle, and wherein the processor is configured to weight the estimated risk based on the estimated severity of damage or injury.

In Example 28, the device of any one of Examples 24 to 27, wherein the processor is further configured to determine an action to mitigate the risk of collision with the second vehicle when the estimated risk is outside of a range.

In Example 29, the device of Example 28, wherein the action to mitigate the risk of collision includes a change in course or trajectory and/or a change in speed.

In Example 30, a method of blind spot determination of a second vehicle in a vicinity of a first vehicle, including: determining one or more context variables associated with the second vehicle; modifying a model of the second vehicle based on one or more context variables; and determining a probability of the first vehicle being within an area of limited visibility in the modified model.

In Example 31, the method of Example 30, further including an image sensor, configured to generate image sensor data representing an image of the second vehicle; and further including determining the one or more context variables from the image sensor data.

In Example 32, the method of Example 30 or 31, further including a transceiver, configured to receive a wireless signal representing wireless transmission data; and further including determining the one or more context variables from the wireless transmission data.

In Example 33, the method of Example 32, wherein the wireless transmission data include sensor data from an edge server and/or an infrastructure unit.

In Example 34, the method of any one of Examples 30 to 33, wherein the one or more context variables include any of sensor type and placement on the second vehicle; sensor operability; whether driver visibility via a rear-view mirror is obstructed by one or more objects within the second vehicle; whether a trailer is attached to the second vehicle; whether a bicycle rack is attached to the second vehicle; or whether a mirror is missing from the second vehicle.

In Example 35, the method of any one of Examples 30 to 34, further including an image sensor, configured to generate image sensor data representing an image of the second vehicle, further including determining a vehicle configuration of the second vehicle using the image sensor data, and selecting a stored model from a plurality of stored models as the model of the second vehicle based on the determined vehicle configuration; and wherein modifying the model of the second vehicle includes modifying the selected stored model.

In Example 36, the method of Example 35, wherein processor determining the vehicle configuration of the second vehicle using the image sensor data includes detecting from the image sensor data an identifier of the second vehicle and selecting the stored model based on the identifier.

In Example 37, the method of Example 36, wherein the identifier includes a make of the second vehicle, a model of the second vehicle, a chassis type of the second vehicle, or a vehicle identification number (VIN) of the second vehicle.

In Example 38, the method of Example 35, further including: an artificial neural network, configured to receive the image sensor data and to output an identifier of the second vehicle based on the image sensor data; wherein determining a vehicle configuration of the second vehicle using the image sensor data includes selecting the stored model based on the identifier that is output from the artificial neural network.

In Example 39, the method of any one of Examples 30 to 38, further including:

a transceiver, configured to receive a wireless signal representing the model of the second vehicle.

In Example 40, the method of Example 30 or 39, wherein determining the probability of the first vehicle being within the area of limited visibility in the modified model includes determining the area of limited visibility based on one or more structures of the second vehicle and the one or more context variables.

In Example 41, the method of Example 40, wherein determining the area of limited visibility based on one or more structures of the second vehicle and the one or more context variables includes performing one or more ray tracing procedures to define the area of limited visibility based on the one or more structures of the second vehicle and the one or more context variables.

In Example 42, the method of Examples 40 or 41, wherein determining the probability of the first vehicle being within the area of limited visibility in the modified model includes generating a statistical probability of limited visibility based on the model of the second vehicle as modified by any of mirror position, driver seat position, driver body dimensions, window dimensions and placement, or pillar dimension and placement.

In Example 43, the method of any one of Examples 30 to 42, wherein determining the probability of the first vehicle being within the area of limited visibility in the modified model includes assigning a probability of limited visibility to a region relative to the second vehicle and determining whether the first vehicle is present in the region.

In Example 44, the method of any one of Examples 30 to 43, wherein determining the probability of the first vehicle being within the area of limited visibility in the modified model includes assigning a probability of limited visibility to a region relative to the second vehicle and determining from a trajectory of the second vehicle and a trajectory of the first vehicle whether the first vehicle is likely to be present in the region at a future point in time.

In Example 45, the method of Example 44, further including determining the trajectory from a direction and speed of the second vehicle.

In Example 46, the method of Example 45, further including determining the trajectory from one or more previous actions of the second vehicle.

In Example 47, the method of Example 44, further including determining the trajectory from a wireless communication with the second vehicle.

In Example 48, the method of Example 47, wherein the wireless communication is a vehicle-to-everything (V2X) communication.

In Example 49, the method of any one of Examples 30 to 48, further including sending a signal representing a warning or an instruction to generate a warning if the probability of the first vehicle being within an area of limited visibility is greater than a predetermined threshold.

In Example 50, the method of Example 49, wherein the warning is an auditory warning, a visual warning, or a haptic warning.

In Example 51, the method of any one of Examples 30 to 50, wherein the second vehicle is a motorcycle and wherein the one or more context variables include a type of helmet of a driver of the second vehicle; and wherein modifying the model of the second vehicle based on the one or more context variables includes limiting an area of visibility to a first region when the helmet of the driver is of a first type, and limiting an area of visibility to a second region, greater than the first region, when the helmet of the driver is of a second type.

In Example 52, the method of any one of Examples 30 to 51, wherein the model of the second vehicle or a transmission from the second vehicle includes information about how a driver of the second vehicle is notified of a presence of a vehicle in an area of limited visibility of the second vehicle; and further including determining a response to a probability of the first vehicle entering an area of limited visibility of the second vehicle based on the information about how a driver of the second vehicle is notified of the presence of a vehicle in an area of limited visibility of the second vehicle.

In Example 53, the method of any one of Examples 30 to 52, further including estimating a risk to the first vehicle of being in an area of limited visibility of the second vehicle.

In Example 54, the method of Example 53, further including determining the probability as a function of time spent in an area of limited visibility of the second vehicle.

In Example 55, the method of Example 53 or 54, further including weighting the estimated risk based on whether the first vehicle is in an area of limited visibility of the second vehicle during a period that is critical to a sensor modality or a maneuver.

In Example 56, the method of any one of Examples 53 to 55, further including estimating a severity of damage or injury for a collision that results when the first vehicle is in an area of limited visibility of the second vehicle, and weighting the estimated risk based on the estimated severity of damage or injury.

In Example 57, the method of any one of Examples 53 to 56, further including determining an action to mitigate the risk of collision with the second vehicle when the estimated risk is outside of a range.

In Example 58, the method of Example 57, wherein the action to mitigate the risk of collision includes a change in course or trajectory and/or a change in speed.

In Example 59, a non-transitory computer readable medium, including instructions which, if executed by one or more processors, cause the one or more processors to perform the method of any one of Examples 30 to 58.

In Example 60, a vehicle, including the device of any one of Examples 1 to 29.

In Example 61, a means for determining a blind spot of a second vehicle in a vicinity of a first vehicle, including: a processing means, for: determining one or more context variables associated with the second vehicle; modifying a model of the second vehicle based on one or more context variables; and determining a probability of the first vehicle being within an area of limited visibility in the modified model.

In Example 62, the means of Example 61, further including an image sensing means for generating image sensor data representing an image of the second vehicle; and wherein the processing means is further for determining the one or more context variables from the image sensor data.

In Example 63, the means of Example 61 or 62, further including a wireless communication means, for to receiving a wireless signal representing wireless transmission data; and wherein the processing means is further for determining the one or more context variables from the wireless transmission data.

In Example 64, the means of Example 63, wherein the wireless transmission data include sensor data from an edge server and/or an infrastructure unit.

In Example 65, the means of any one of Examples 61 to 64, wherein the one or more context variables include any of sensor type and placement on the second vehicle; sensor operability; whether driver visibility via a rear-view mirror is obstructed by one or more objects within the second vehicle; whether a trailer is attached to the second vehicle; whether a bicycle rack is attached to the second vehicle; or whether a mirror is missing from the second vehicle.

In Example 66, the means of any one of Examples 61 to 65, further including an image sensing means for generating image data representing an image of the second vehicle, wherein the processing means is further for determining a vehicle configuration of the second vehicle using the image data, and for selecting a stored model from a plurality of stored models as the model of the second vehicle based on the determined vehicle configuration; and wherein modifying the model of the second vehicle includes modifying the selected stored model.

In Example 67, the device of Example 66, wherein the processing means determining the vehicle configuration of the second vehicle using the image data includes the processor detecting from the image sensor data an identifier of the second vehicle and selecting the stored model based on the identifier.

In Example 68, the device of Example 67, wherein the identifier includes a make of the second vehicle, a model of the second vehicle, a chassis type of the second vehicle, or a vehicle identification number (VIN) of the second vehicle.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device for blind spot determination of a second vehicle in a vicinity of a first vehicle, comprising:

a processor, configured to:

determine one or more context variables associated with the second vehicle;

modify a digital model of the second vehicle based on one or more context variables;

determine a probability of the first vehicle being within an area of limited visibility in the modified digital model; and determine an action to mitigate a risk of collision with the second vehicle when the probability is outside of a range, wherein the action to mitigate the risk of collision comprises a change in course or trajectory and/or a change in speed; and control the first vehicle to perform the action to mitigate the risk of collision.

2. The device of claim 1, further comprising a sensor, configured to generate sensor data representing the second vehicle; and wherein the processor is configured to determine the one or more context variables from the sensor data.

3. The device of claim 1, further comprising a transceiver, configured to receive a wireless signal representing wireless transmission data; wherein the processor is configured to determine the one or more context variables from the wireless transmission data; and wherein the wireless transmission data comprise sensor data from an edge server and/or an infrastructure unit.

4. The device of claim 1, wherein the one or more context variables comprise any of sensor type and placement on the second vehicle; sensor operability; whether driver visibility via a rear-view mirror is obstructed by one or more objects within the second vehicle; whether a trailer is attached to the second vehicle; whether a bicycle rack is attached to the second vehicle; or whether a mirror is missing from the second vehicle.

5. The device of claim 1, further comprising a sensor, configured to generate sensor data representing the second vehicle, wherein the processor is further configured to determine a vehicle configuration of the second vehicle using the sensor data, and to select a stored digital model from a plurality of stored digital models as the model of the second vehicle based on the determined vehicle configuration; and wherein modifying the digital model of the second vehicle comprises modifying the selected stored digital model.

6. The device of claim 5, wherein the processor determining the vehicle configuration of the second vehicle using the sensor data comprises the processor detecting from the sensor data an identifier of the second vehicle and selecting the stored digital model based on the identifier; and wherein the identifier comprises a make of the second vehicle, a model of the second vehicle, a chassis type of the second vehicle, or a vehicle identification number (VIN) of the second vehicle.

7. The device of claim 5, further comprising:

an artificial neural network, configured to receive the sensor data and to output an identifier of the second vehicle based on the sensor data; and wherein the processor determining a vehicle configuration of the second vehicle using the sensor data comprises the processor selecting the stored digital model based on the identifier that is output from the artificial neural network.

8. The device of claim 1, wherein determining the probability of the first vehicle being within the area of limited visibility in the modified digital model comprises determining the area of limited visibility based on one or more structures of the second vehicle and the one or more context variables; and wherein determining the area of limited visibility based on one or more structures of the second vehicle and the one or more context variables comprises performing one or more ray tracing procedures to define the area of limited visibility based on the one or more structures of the second vehicle and the one or more context variables.

9. The device of claim 8, wherein the processor determining the probability of the first vehicle being within the area of limited visibility in the modified digital model comprises the processor generating a statistical probability of limited visibility based on the model of the second vehicle as modified by any of mirror position, driver seat position, driver body dimensions, window dimensions and placement, or pillar dimension and placement.

10. The device of claim 1, wherein the processor determining the probability of the first vehicle being within the area of limited visibility in the modified digital model comprises the processor assigning a probability of limited visibility to a region relative to the second vehicle and determining whether the first vehicle is present in the region.

11. The device of claim 1, wherein the processor determining the probability of the first vehicle being within the area of limited visibility in the modified digital model comprises the processor assigning a probability of limited visibility to a region relative to the second vehicle and determining from a trajectory of the second vehicle and a trajectory of the first vehicle whether the first vehicle is likely to be present in the region at a future point in time.

12. The device of claim 1, wherein the second vehicle is a motorcycle and wherein the one or more context variables comprise a type of helmet of a driver of the second vehicle; and wherein modifying the digital model of the second vehicle based on the one or more context variables comprises limiting an area of visibility to a first region when the helmet of the driver is of a first type, and limiting an area of visibility to a second region, greater than the first region, when the helmet of the driver is of a second type.

13. The device of claim 1, wherein the digital model of the second vehicle or a transmission from the second vehicle comprises information about how a driver of the second vehicle is notified of a presence of a vehicle in an area of limited visibility of the second vehicle; and wherein the processor is further configured to determine a response to a probability of the first vehicle entering an area of limited visibility of the second vehicle based on the information about how a driver of the second vehicle is notified of the presence of a vehicle in an area of limited visibility of the second vehicle.

14. The device of claim 1, wherein the processor is further configured to estimate a risk to the first vehicle of being in an area of limited visibility of the second vehicle.

15. The device of claim 14, wherein the processor is further configured to determine the action to mitigate the risk of collision with the second vehicle when the estimated risk is outside of a range.

16. A vehicle comprising the device of claim 1.

17. A non-transitory computer readable medium, comprising instructions which, if executed by one or more processors, cause the one or more processors to:

determine one or more context variables associated with a second vehicle;

modify a digital model of the second vehicle based on one or more context variables;

determine a probability of a first vehicle being within an area of limited visibility in the modified digital model; and determine an action to mitigate a risk of collision with the second vehicle when the probability is outside of a range, wherein the action to mitigate the risk of collision comprises a change in course or trajectory and/or a change in speed; and control the first vehicle to perform the action to mitigate the risk of collision.

18. The non-transitory computer readable medium of claim 17, wherein the one or more context variables comprise any of sensor type and placement on the second vehicle; sensor operability; whether driver visibility via a rear-view mirror is obstructed by one or more objects within the second vehicle; whether a trailer is attached to the second vehicle; whether a bicycle rack is attached to the second vehicle; or whether a mirror is missing from the second vehicle.

* * * * *